United States Patent [19]
Baldini et al.

[11] 4,268,666
[45] May 19, 1981

[54] PROCESS FOR THE DISSOLUTION OF CELLULOSE IN ORGANIC SOLVENTS, SOLUTIONS OBTAINED BY SAID PROCESS, AND PROCESS FOR THE PRODUCTION OF FORMED BODIES OF REGENERATED CELLULOSE FROM SAID SOLUTIONS

[75] Inventors: Alberto Baldini, Garlasco; Roberto Leoni, Milan; Angelo Calloni, Buscato; Gianfranco Angelini, Buscate, all of Italy

[73] Assignee: SNIA VISCOSA Societa Nazionale Industria Applicazioni Viscosa S.p.A., Milan, Italy

[21] Appl. No.: 25,068

[22] Filed: Mar. 29, 1979

[30] Foreign Application Priority Data

Apr. 3, 1978 [IT] Italy ............................. 21922 A/78

[51] Int. Cl.³ ..................... C08B 16/00; C08L 1/02; C08L 1/08
[52] U.S. Cl. ..................... 536/57; 106/168; 106/187; 106/203; 536/56
[58] Field of Search ............... 536/56, 57; 106/168, 106/203, 187

[56] References Cited

U.S. PATENT DOCUMENTS

| | | | |
|---|---|---|---|
| 1,234,720 | 7/1917 | Bloch-Pimentel | 536/56 |
| 4,022,631 | 5/1977 | Turbak et al. | 106/168 |
| 4,076,932 | 2/1978 | Hammer et al. | 536/57 |
| 4,097,666 | 6/1978 | Johnson et al. | 536/57 |
| 4,129,451 | 12/1978 | Menault et al. | 106/168 |
| 4,129,640 | 12/1978 | Rodier | 106/168 |
| 4,145,532 | 3/1979 | Franks et al. | 536/57 |

FOREIGN PATENT DOCUMENTS 1197322 7/1970 United Kingdom ................. 536/56

*Primary Examiner*—Ronald W. Griffin
*Attorney, Agent, or Firm*—Wenderoth, Lind & Ponack

[57] ABSTRACT

A process for the dissolution of cellulose in organic solvents such as dimethylformamide, dimethylacetamide, and N-methylpyrrolidone is described which comprises contacting the cellulose with an excess of paraformaldehyde and with the solvent at elevated temperatures, preferably higher than 115° C. The amount of paraformaldehyde used preferably corresponds to at least 13 $CH_2O$ units per anhydroglucosidic unit of the cellulose. The solution obtained can be rendered stable at room temperature by heating it under stirring to lower the paraformaldehyde content, preferably to not less than 8 $CH_2O$ units per anhydroglucosidic unit. Formed bodies of regenerated cellulose can be obtained from said solutions by coagulating them in an aqueous bath, which may be alkaline or may be a mixture of water and the solvent of the solution, or even by evaporating the solvent.

17 Claims, No Drawings

PROCESS FOR THE DISSOLUTION OF CELLULOSE IN ORGANIC SOLVENTS, SOLUTIONS OBTAINED BY SAID PROCESS, AND PROCESS FOR THE PRODUCTION OF FORMED BODIES OF REGENERATED CELLULOSE FROM SAID SOLUTIONS

BACKGROUND OF THE INVENTION (a) The Field of the Invention

The present invention relates to a process for the dissolution of cellulose in organic solvents, to solutions obtained by said process, and to a process for the production of formed bodies of regenerated cellulose from said solutions.

The art has devoted considerable attention to the problem of preparing cellulose solutions in organic solvents, capable of yielding formed bodies of regenerated cellulose, such as membranes of yarns, by coagulation. Regenerated cellulose membranes and yarns are presently prepared on a large industrial scale through chemical processes, such as e.g. the so-called viscose process, based on the formation of cellulose xantogenate, which has several well-known drawbacks.

(b) The State of the Art

Binary or tertiary systems capable of dissolving cellulose have been described in the literature, but these have a purely experimental interest or at least are not suitable for industrial application.

Such a system is constituted of paraformaldehyde or formaldehyde and dimethylsulphoxide (DMSO), in which system cellulose is dissolved through the formation of derivatives the structure whereof is not precisely known and which are generally regarded as methylol derivatives. The resulting solutions, however, are difficult to coagulate to generate formed bodies. In U.S. Pat. No. 4,022,631 a method for regenerating the cellulose from said solutions is described and claimed, which is characterized by the use of alkaline coagulating agents, e.g. ammonia, but said method too is not suitable for industrial production.

Other organic solvents are known which are preferable to DMSO for economical and process reasons and which are already employed for making spinnable solutions e.g. of acrylic polymers. The most commonly used among them is dimethylformamide (DMF) but others, in particular dimethylacetamide, have been employed successfully in spinning acrylic polymers. The relevant chemical literature however teaches that these solvents cannot be used in place of DMSO inasmuch as the cellulose is not soluble in a system composed of paraformaldehyde or formaldehyde and DMF, dimethylacetamide, and the like.

SUMMARY OF THE INVENTION

The Applicant has now surprisingly found that, contrary to such teachings, it is possible to prepare solutions of cellulose in a system composed of paraformaldehyde and organic solvents, different from DMSO which are mostly aprotic polar solvents, particularly DMF, dimethylacetamide and N-methylpyrrolidone, in the presence of a strong excess of paraformaldehyde and at a sufficiently elevated temperature. A good solution is formed, e.g., when employing amounts of paraformaldehyde equal to 13 or more $CH_2O$ units per anhydroglucosidic unit of the cellulose and temperatures above 115° C., e.g. 120°–130° C.

The Applicant has also surprisingly found that the cellulose may be regenerated from said solutions by coagulation in aqueous baths, specifically mixtures of water and of the solvent employed at elevated temperatures, or alkaline, e.g. ammonia, baths even at room temperature. Further it is also possible to form bodies composed essentially of cellulose, possibly containing small quantities of $CH_2O$ units and of solvent, by evaporating the solvent. Surprisingly, in this way the cellulose is regenerated in the dry.

It is not possible at present to precisely define the structure of the cellulose derivative which presumably is formed in the dissolution or the exact mechanism of the dissolution itself. Since the invention is entirely surprising and contrary to known chemical teachings it is not yet possible to offer a complete and reliable scientific interpretation thereof.

Dimethylformamide and dimethylacetamide are the preferred solvents, but other aprotic polar solvents, e.g. N-methylpyrrolidone, may be employed.

Said solvents could also be used in mixtures and small amounts of other organic solvents, in particular DMSO might be added thereto, without essentially changing the process and its results.

A preferred form of the process according to the invention comprises suspending cellulose and paraformaldehyde powder in the solvent, e.g. DMF, and heating the suspension under stirring until a sufficiently clear solution has been formed. The operation is preferably carried out in a closed reactor, whereby a small pressure increase occurs. Then the reactor is preferably vented without substantial temperature variation, till room pressure is reached, and the solution may be discharged, or it may be spun directly from the reactor and regenerated in a bath of water and the solvent in suitable proportions and at a suitable temperature.

It has been found that viscous solutions may be prepared which possess of better spinning properties, by which is meant that they are more easily coagulated e.g. in aqueous baths, if the content of $CH_2O$ units per anhydroglucosidic unit of the cellulose is reduced preferably to a substantial extent, even to a value as low as 3. Therefore, in a still more preferred form of the invention, the solution is vented after its preparation, preferably at room pressure and at an elevated temperature, for instance 120° C., until the $CH_2O$ unit content has been reduced as desired.

Alternatively, the content of $CH_2O$ units in the solution may be reduced without venting, by producing in the reaction room a cold zone without reducing pressure. The expression "cold zone" signifies a zone in which the temperature is lower than that prevailing in the remaining reaction room and is such as to permit the condensation (reverse sublimation) of paraformaldehyde. A small difference of temperature may be sufficient. Ordinarily said zone is cooled by water circulation.

Normally the matter which condenses in this way has a paraformaldehyde content variable from 30 to 70%, more often about 50%, and is recovered. (All percentages in this specification are by weight, unless otherwise specified).

It has also been found that it is desirable to reduce to a minimum the amount of water present in the solution and which normally derives from moisture contained in the commercial starting products. It has been found that if said products are dried so as to substantially eliminate or at least to minimize their moisture content and/or, if substantially moisture free reagents are used, so that the water content in the solution is not higher than 0.5%; clearer, more concentrated and better spinnable solutions are obtained. The $H_2O$ content of the solution e.g. about 0.3%, should preferably be from 0.1 to 0.5%.

As has been said, the invention has as its objects the process for the dissolution of the cellulose in the aforesaid solvents (whereby cellulose derivatives, the structure of which is not precisely known, are formed), the solutions thus obtained, the process for the production of formed bodies, such as filaments or films, by coagulation of said solutions, and the filaments and films thus obtained.

DETAILED DESCRIPTION OF PREFERRED EMBODIMENTS

Some non-limitative and illustrative preferred embodiments of the invention will now be described.

EXAMPLE 1

A suspension of 48 parts of Ray-select-J (DP about 495) cellulose and 128 parts of commercial paraformaldehyde powder in 522 parts of dimethylformamide is heated to 125° C. under efficient stirring in a closed glass reactor. A clear, slightly yellow solution is obtained in about one hour. The pressure in the reactor rises to approximately 1.5 $Kg/cm^2$. The reactor is vented carefully at about 120° C. until room pressure is reached and is discharged in the hot. 679 parts of a solution are obtained, from which, when cooled, paraformaldehyde is precipitated. Said solution has the following characteristics:
Cellulose content: 6.60%
$CH_2O$ content: 14.95%
Viscosity at 20° C. about 1450 poise
$\overline{DP}$: about 406
all the percentages are by weight.

The cellulose may be easily regenerated from the solutions by coagulation in a bath of $H_2O$/DMF (1:1) at elevated temperature (50°-80°), of $H_2O$ at elevated temperature, or of aqueous $NH_3$ at room temperature. The solution, which is opaque in the cold, is heated to 120°-125° for 30 min. in an open vessel, under stirring. The final $CH_2O$ content is 11.1% and the cellulose content 7.2% ($CH_2O$/anhydroglucosidic units ratio about 8.3). The solution remains almost clear even at room temperature for some hours.

The filaments or membranes or other bodies obtained by the coagulation of said solution have all the physical and chemical characteristics of regenerated cellulose.

The solutions remain clear in the hot, and if cooled, tend to become very opaque, but are reversible inasmuch as if they are heated, even in an open vessel, under stirring to the temperature at which they have been initially formed, or to its vicinity, they become clear once again and remain almost clear even at room temperature. The heating, however, lowers the $CH_2O$ content, e.g. to 11% in the case of the present embodiment.

As set forth hereinbefore, small amounts of other solvents may be added to the solvents of the invention. E.g., small amounts of DMSO may be added to DMF as illustrated in the following example.

EXAMPLE 2

A suspension of 48 parts of Ray-selected-J (DP about 495) cellulose and 128 parts of paraformaldehyde in 5 parts of dimethylsulphoxide and 522 parts of dimethylformamide is heated to 120° C. under stirring in a closed reactor.

A clear solution is obtained in one hour. The pressure in the reactor rises to about 1.5 $Kg/cm^2$. The reactor is vented and the solution is discharged in the hot. Paraformaldehyde precipitates when the solution is cooled. The solution has the following characteristics:
Cellulose content: 6.5%
$CH_2O$ content: 15.0%
$\overline{DP}$: about 405

150 parts of said solution are heated in an open vessel for one and a half hour. After such treatment, the solution remains clear even at room temperature for some hours. Its characteristics are the following:
Cellulose content: 6.9
$CH_2O$ content: 11.1%
viscosity at 20° about 1400 poise
$\overline{DP}$: about 400

The cellulose may be easily regenerated from the solution by coagulation in a bath of aqueous $NH_3$, of hot $H_2O$, or of a hot $H_2O$/DMF (1:1) mixture.

Larger amounts of DMSO than in example 2 may be used, as shown by the following.

EXAMPLE 3

The operations of Example 2 are repeated, using 48 parts of cellulose, 128 parts of paraformaldehyde in 47 parts DMSO and 522 parts DMF. The resulting solution has the following characteristics:
Cellulose content: 6.18%
$CH_2O$ content: 14.94%
Viscosity at 20° about 1390 poise Part of the solution is vented for an additional hour at 120°. After this treatment, the solution is clear even at 20° and has the following characteristics:
Cellulose content: 7.26% ($\overline{DP}$ about 410)
$CH_2O$ content: 9.29% ($CH_2O$/anhydroglucosidic units ratio about 6.9)

| Viscosity at 20° | about 1315 poise |
|---|---|
| at 40° | about 545 poise |
| at 50° | about 375 poise |
| at 60° | about 260 poise |

By diluting this last solution with DMF to various cellulose concentrations the following viscosities have been obtained:

| Cellulose in solution (%) | Viscosity (poise) |
|---|---|
| 6 | 445 |
| 5 | 175 |
| 4 | 55 |

The following examples illustrate the use of other solvents according to the invention.

EXAMPLE 4

20 parts of the untreated Ray-selected-J cellulose and 72 parts of paraformaldehyde are placed in an autoclave with 220 parts of dimethylacetamide. The whole is heated to 130° C. The pressure reaches 2.5 $Kg/cm^2$ and a clear solution containing 7% cellulose and 19% formaldehyde is obtained in one hour. This solution remains stable for hours even after venting to a 11% formaldehyde content.

EXAMPLE 5

10 parts of untreated Ray-selected-J cellulose and 36 parts of formaldehyde are placed in an autoclave with 118 parts of N-methylpyrrolidone. The whole is heated to 120° C. and 1.7 Kg/cm² pressure. A clear solution is obtained in 45 minutes which contains 6.9% cellulose and 18% formaldehyde, and is stable for hours.

The following example illustrates the regeneration of the cellulose in the dry.

EXAMPLE 6

By heating a thin layer of the solution obtained according to Example 1 to above 160° C. on glass plates in an oven, the greater part of the DMF and of the paraformaldehyde is eliminated and a cellulose film is formed.

By way of example, the temperature in the oven is 175° and the heating time 5 minutes. The residue of $CH_2O$ in the regenerated cellulose is about 2% of the dry material. The film is insoluble in DMSO.

Some embodiments have been described for illustrative purposes, but the invention may be carried into practice with many variations, modifications and adaptations, within an extremely wide domain, since it is essentially based on the surprising discovery that it is possible to dissolve cellulose in the presence of paraformaldehyde in solvents in which the literature indicated that it was not soluble.

EXAMPLE 7

48 parts of Rayselect-J cellulose ($\overline{DP}$ about 495) previously dried in an oven at 105° C. for one hour and 128 gr. of commercial paraformaldehyde having a low moisture content ($H_2O$ 0.8%, $CH_2O$ 95%) are suspended in 522 parts of substantially anhydrous ($H_2O$ about 0.07%) DMF (dimethylformamide) and are heated under efficient stirring in a closed glass reactor provided with a heating jacket and a metal head. The total amount of free water in said suspension is 0.2–0.3%. The temperature increases from 30°–124° C. in about 50 minutes and a clear solution is obtained. The reaction is continued at 124°–130° for another 30 minutes, whereafter the reactor head is cooled by water circulation at room temperature while the reaction mixture is maintained at 115°–125° for about one and a half hour. In this phase formaldehyde is eliminated from the solution and paraformaldehyde is condensed on the cold reactor head. Then the reactor is cautiously vented to room pressure and the solution is discharged at elevated temperature.

The cooled solution becomes turbid with the passing of time. It has the following characteristics:
Cellulose: 7.5% ($\overline{DP}$ about 400)
$CH_2O$: 10.5%
Viscosity at 20° C.: about 1500 poise The paraformaldehyde product collected on the reactor head contains about 50% of DMF.

The cellulose may be easily regenerated from the solution by coagulation in a $H_2O$/DMF bath at 70°–80°, in $H_2O$ at 50°–80°, in aqueous/$H_2SO_4$ solutions at 40°–80°, or in aqueous $NH_3$ solutions at room temperatures.

EXAMPLE 8

40 parts of Rayselect-J cellulose (DP about 495) previously dried in an oven at 105° for one half hour ($H_2O$ 0.68%) and 116 parts of commercial paraformaldehyde powder having a low moisture content ($H_2O$ 0.7%, $CH_2O$ 95%) are suspended in 321 parts of substantially anhydrous ($H_2O$, 0.09%) N,N'-dimethylacetamide and are heated under efficient stirring in a closed glass reactor provided with a heating jacket and a metal head. The total amount of free water in said suspension is 0.2–0.3%. In about one hour the temperature rises from 30° to 126° C. and a clear solution is obtained. The reaction is continued at 126°–130° for another 30 minutes, whereafter the reactor head is cooled by water circulation while the reaction mixture is maintained at 115°–125° C. for about two hours and a half. In this phase formaldehyde is eliminated from the solution and paraformaldehyde is condensed on the cooled reactor head. Thereafter the reactor is cautiously vented to room pressure and the solution is discharged at elavated temperature.

The cooled solution becomes a clear paste, the viscosity of which is not measurable at room temperature. It has the following characteristics:
Cellulose: 13% ($\overline{DP}$ about 160)
$CH_2O$: 13.6%.

The cellulose may be easily regenerated from the solution in the baths already described with reference to Example 1.

EXAMPLE 9

48 parts of Rayselect-J cellulose ($\overline{DP}$ about 500) dried to about 1% of $H_2O$, and 116 parts of paraformaldehyde containing about 95% $CH_2O$ and 0.3% free $H_2O$, are charged into an autoclave with 350 parts of dimethylacetamide containing 0.1% $H_2O$.

After heating under stirring for one hour at 127° C., a clear solution is obtained.

At this point only the upper part of the autoclave is cooled, whereby the formaldehyde is evaporated until a highly viscous solution is obtained containing 14.12% of cellulose and 11.86% of $CH_2O$ with a $CH_2O$/Cellulose molar ratio equal to 4.54% and $\overline{DP}$ about 400.

EXAMPLE 10

48 parts of Rayselect-J cellulose ($\overline{DP}$ about 500) dried to about 1% $H_2O$, and 116 parts of paraformaldehyde containing about 95% $CH_2O$ and 0.35% free $H_2O$, are charged into an autoclave with 321 parts of N-methylpyrrolidone containing 0.07% $H_2O$. After heating under stirring for one hour at 127° C., a clear solution is obtained.

Only the upper part of the autoclave is cooled whereby formaldehyde is evaporated until the solution contains 14.9% cellulose and 8.3% $CH_2O$ with a $CH_2O$/Cellulose molar ratio equal to 3 and $\overline{DP}$ 417.

EXAMPLE 11

7 parts of Rayselect-J cellulose ($\overline{DP}$ about 100) dried to 1% $H_2O$, and 25 parts of paraformaldehyde recovered from a previous preparation, washed with m-xylene and evaporated until it contains 95% $CH_2O$ and 0.53% free $H_2O$, are charged into an autoclave with 200 parts of dimethylformamide containing 0.17% $H_2O$.

After heating under stirring for one hour at 130°, a clear solution is obtained. This latter is cooled to 112° C. and evaporated for three hours until a viscose is obtained containing 4% cellulose and 2.28% $CH_2O$ with a $CH_2O$/Cellulose molar ratio equal to 3 and $\overline{DP}$ 358.

We claim:

1. A process for the dissolution of cellulose in a solvent selected from the group consisting of dimethylformamide, dimethylacetamide and N-methylpyrrolidone characterized in that the cellulose is contacted with an excess of paraformaldehyde and with said solvent at elevated temperatures.

2. A process according to claim 1, characterized in that the amount of paraformaldehyde used corresponds to at least 13 $CH_2O$ units per anydroglucosidic unit of the cellulose.

3. A process according to claim 1, characterized in that the temperature is higher than 115° C.

4. A process according to claim 1, characterized in that the cellulose and paraformaldehyde powder are suspended in the solvent and the suspension is heated in a closed vessel under efficient stirring.

5. A process according to claim 1, characterized in that the solution obtained is treated to lower its formaldehyde content.

6. A process according to claim 5, characterized in that the treatment to lower the formaldehyde content is discontinued before the amount of paraformaldehyde in the solution has decreased below 3 $CH_2O$ units per anhydroglucosidic unit of the cellulose.

7. A process according to claim 5, characterized in that the formaldehyde of the solution is reduced by venting the solution at elevated temperature.

8. A process according to claim 5, characterized in that the formaldehyde of the solution is reduced by producing, in a space communicating with the reaction space, a zone having a temperature lower than the reaction temperature, whereby to cause the condensation of the paraformaldehyde.

9. A process according to claim 8, characterized in that the lower temperature zone is produced by circulation of a cooling fluid.

10. A process according to claim 1 in which the solution is treated to lower the formaldehyde content by cooling the solution to form an opaque solution, and the resulting opaque solution is heated once more under stirring to temperatures close to the temperatures at which it has been formed.

11. A process according to claim 1, characterized in that dimethylsulphoxide is added to the solvent.

12. A process according to claim 1, characterized in that starting products are employed having a low moisture content.

13. A process according to claim 12 characterized in that the moisture content of the starting products is such as to determine a water content of the solution not higher than 0.5%.

14. A process according to claim 12, characterized in that the starting products are dried to reduce the water content to the desired value.

15. Solutions of cellulose derivatives in a solvent selected from the group consisting of dimethylformamide, dimethylacetamide and N-methylpyrrolidione, and containing paraformaldehyde in excess of the anhydroglucosidic units in said cellulose.

16. Solutions according to claim 15, additionally containing dimethylsulphoxide.

17. Solutions according to claim 16, wherein the amount of paraformaldehyde is at least 8 $CH_2O$ units per anhydroglucosidic unit of the cellulose.

* * * * *